(12) United States Patent
Magnin et al.

(10) Patent No.: US 9,151,697 B2
(45) Date of Patent: Oct. 6, 2015

(54) METHOD OF MEASURING LOADINGS IN JOINS IN A HIGH-TEMPERATURE ENVIRONMENT AND INSTRUMENTED SHAFT FOR IMPLEMENTATION, IN PARTICULAR FOR REAR ATTACHMENT OF AIRCRAFT TURBOJET

(75) Inventors: Hervé Magnin, Flourens (FR); Géraldine Hache, Plaisance du Touch (FR)

(73) Assignee: Airbus Operations (S.A.S.) (FR)

( * ) Notice: Subject to any disclaimer, the term of this patent is extended or adjusted under 35 U.S.C. 154(b) by 161 days.

(21) Appl. No.: 13/822,682

(22) PCT Filed: Sep. 13, 2011

(86) PCT No.: PCT/FR2011/052081
§ 371 (c)(1),
(2), (4) Date: May 13, 2013

(87) PCT Pub. No.: WO2012/035245
PCT Pub. Date: Mar. 22, 2012

(65) Prior Publication Data
US 2013/0305817 A1    Nov. 21, 2013

(30) Foreign Application Priority Data
Sep. 14, 2010 (FR) .................................... 10 57305

(51) Int. Cl.
*G01L 1/22* (2006.01)
*G01M 17/04* (2006.01)
(Continued)

(52) U.S. Cl.
CPC ............. *G01M 17/04* (2013.01); *B64D 27/26* (2013.01); *G01L 1/22* (2013.01); *G01L 1/2218* (2013.01);
(Continued)

(58) Field of Classification Search
CPC ....... G01L 5/0004; G01L 1/2225; G01L 1/22; G01L 1/2218
USPC ..................... 73/760, 862, 862.381, 862.451, 73/862.393, 862.68
See application file for complete search history.

(56) References Cited

U.S. PATENT DOCUMENTS 3,433,063 A * 3/1969 Ten Cate .................. 73/862.635
6,341,746 B1   1/2002 Pascal et al.

FOREIGN PATENT DOCUMENTS

DE   102007012157 A1   9/2008
EP         1053936 A1   11/2000
(Continued)

OTHER PUBLICATIONS

"Special Purpose Strain Gages High Temperature Weldable Strain Gages" XP002632720, Oct. 24, 2005, retrieved from Internet: URL: http://www.datasheetcatalog.org/datasheet/vishay/hightem.pdf [retrieved on Apr. 13, 2011].
International Search Report for Application No. PCT/FR2011/052081 dated Nov. 16, 2011.

*Primary Examiner* — Lisa Caputo
*Assistant Examiner* — Tran M Tran
(74) *Attorney, Agent, or Firm* — Lerner, David, Littenberg, Krumholz & Mentlik, LLP

(57) ABSTRACT

The invention aims to produce an instrumentation making it possible to measure the loadings which pass through mechanical joins between two mechanical structures, so as to best evaluate the dimensions and masses without impairing their mechanical properties of a secure transfer of load. To this end, the invention proposes introducing into the zones of transit of the loadings an instrumented component of the form that favors the measurement of shear and its installation. In one embodiment, a zone of transit of loadings consists of an instrumentalized hollow shaft which takes the form of a cylinder (1) able to be introduced into collinear openings (30) in the fittings (20, 25, 26). It comprises a longitudinal housing (10) into which is introduced an insert (2) composed of a central prop (21) in tight contact with the internal wall (1*i*) of the shaft (1) and connected, on each side, to a flyweight (31, 32) also in tight contact, by way of multiple tabs (41 to 44) away from contact with said internal wall (1*i*). High-temperature gauges (51, 53, 55, 57) are welded to the tabs (41 to 44), so as to measure a variation in electrical resistance corresponding to the bending deformation of the tabs (41 to 44).

6 Claims, 2 Drawing Sheets

(51) Int. Cl.
    *B64D 27/26*    (2006.01)
    *G01L 5/00*     (2006.01)
    *G01L 5/16*     (2006.01)
    *B64D 45/00*        (2006.01)

(52) U.S. Cl.
    CPC ............. *G01L 1/2225* (2013.01); *G01L 5/0004* (2013.01); *G01L 5/161* (2013.01); *B64D 2045/0085* (2013.01)

(56) References Cited

FOREIGN PATENT DOCUMENTS

| | | | |
|---|---|---|---|
| FR | 2315690 A1 | 1/1977 | |
| JP | EP 0154728 B1 * | 11/1988 | ................ E02F 9/26 |
| SE | EP0154728 A1 * | 9/1985 | ................ E02F 9/26 |

\* cited by examiner

METHOD OF MEASURING LOADINGS IN JOINS IN A HIGH-TEMPERATURE ENVIRONMENT AND INSTRUMENTED SHAFT FOR IMPLEMENTATION, IN PARTICULAR FOR REAR ATTACHMENT OF AIRCRAFT TURBOJET

CROSS-REFERENCE TO RELATED APPLICATIONS

The present application is a national phase entry under 35 U.S.C. §371 of International Application No. PCT/FR 2011/052081, filed Sep. 13, 2011, published in French, which claims priority from French Application No. 1057305 filed Sep. 14, 2010, all of which are incorporated herein by reference.

TECHNICAL FIELD

The invention relates to a method for measuring loadings through joins between mechanical structures located in a high-temperature environment and to an instrumented shaft for implementing this measurement. The invention applies in particular, although not exclusively, to the rear suspension attachments of aircraft turbojet engines.

Awareness of the intensity and the direction of shear loadings, passing through a join between mechanical structures that are working under load, allows the size of the joining components and the frequency with which these components are inspected to be optimized. In general, the loadings pass through the join in specific regions through which they pass, for example hollow pin or "hollow shaft" connections between the joining pieces. It is therefore in these regions that the loadings are measured.

PRIOR ART

A sufficiently precise and dependable measurement of the loadings means that lean design principles can be applied to the sizing of these components, thus making it possible to reduce the mass of this join, and to reduce the frequency of the maintenance and overhaul operations related to it.

Now, these loadings are currently estimated using calculation and are extensively overestimated because of uncertainty regarding the values obtained. In order to reduce the margins of overestimation—in terms of size and therefore in terms of mass—during the mechanical design phase, shear loadings can be measured using strain gauges with which the regions through which these loadings pass can be instrumented. For example, measuring loadings during flight trials would make it possible to optimize the dimensions of the aircraft rear attachments.

However, in the intended type of application, flexible strain gauges bonded to metal bars cannot be used. This is because in order to obtain repeatable measurements in the regions of connection with hollow shafts it would be necessary to machine grooves in the shafts at the connections between the components that make up the join, in order to create a uniform field of strain around the gauges. However, this need is incompatible with the requirement for the shaft to have sufficient fatigue strength.

In addition, current instrumentation using these gauges does not allow them to be used beyond temperatures of the order of 280° C., because such instrumentation is unable to withstand high temperatures, for example 450° C. Thus, in the region of the rear engine attachment, where high temperatures are reached because of the proximity to the casing via which the residual hot gases are ejected and the proximity to the combustion casing, any conventional instrumentation is destroyed in the few minutes following the starting of the engine, because of the heat produced.

Certain welded extensometric strain gauges are able to withstand higher temperatures which could be classified as high temperatures. However, these gauges are no more suitable because of their size. This is because they require the inclusion of instrumentation tools the sizes of which are appreciably greater than the regions through which the loadings pass in the target mechanical structures. In particular, the significant curvature of the hollow shafts and the small dimensions inside the shaft mean that these shafts cannot be instrumented.

SUMMARY OF THE INVENTION

The invention specifically seeks to create instrumentation that makes it possible to measure the loadings passing through the mechanical joins, particularly the engine rear attachments, so that the dimensions and masses can best be evaluated without detracting from their mechanical safe load transfer properties. To this end, the invention proposes to introduce into the regions through which these loadings pass an instrumented component of a shape that encourages the measurement of bending and the installation thereof.

More specifically, one subject of the present invention is a method for measuring the passage of loadings through joins in the mechanical structures located in a high-temperature environment. The method consists in creating a component having parts able to come into contact with regions through which loadings pass, and multiple intermediate portions extending longitudinally without contact with the region between the contact parts, in instrumenting the intermediate portions for extensometric measurement, in inserting the instrumented component into a region through which loadings pass in order to establish multiple contact with the component and a central bearer, so that bending of this region induces bending of the intermediate portions of the component, and in measuring the flexural deformation of the region in shear planes from variations in length of the intermediate portions using the instrumentation of the component.

Advantageously, the non "contacting" portions of the component are easier to instrument because of their accessibility. Bending is measured by electrical connection to the non-contacting intermediate portions.

The invention also relates to an instrumented hollow shaft for implementing the above loading-measurement method. The hollow shaft may constitute a region through which loadings pass in a join between two mechanical structures. It takes a form that can be inserted into collinear openings of the mounts of the join. The hollow shaft comprises a longitudinal housing into which is inserted an insert made up of at least one central bearer in close contact with the internal wall of the shaft and connected, on each side, to a bobweight, likewise in close contact, via multiple tabs running longitudinally without contact with said internal wall. High-temperature gauges are welded to the tabs, electrically powered and connected to the terminals of at least one electric balancing bridge capable of measuring a variation in electrical resistance corresponding to the flexural deformation of the tabs.

In some particular embodiments, the tabs extend into grooves made in the bobweights, the tabs and the bobweights are machined as a single component.

The invention applies in particular to the rear suspension attachments of an aircraft turbojet engine providing the connection between a pylon and an engine casing. A rear attachment is made up of connecting yokes joined together in particular via connecting rods. The yokes and the intermediate connecting rods constitute mounts that have collinear openings in which hollow connecting shafts are instrumented in accordance with the above features. It is through these shafts that all the loadings of the rear engine attachment pass.

In this application, measurement of loadings cannot be delocalized because of the numerous paths followed by the loadings after they have passed through these shafts. What is more, any structural modification to the shafts or to the connecting yokes is inconceivable because of the mechanical criticality of these components. All of the flexural deformation measurements will characterize the measurement of the loadings passing through the rear attachment under examination.

The engine rear attachment hollow shafts are advantageously instrumented using inserts of the type described hereinabove comprising a central support and two end bobweights which are coupled to the central support via four tabs per bobweight.

BRIEF DESCRIPTION OF THE FIGURES

Other aspects, features and advantages of the present application will become apparent from reading the detailed description which follows and which refers to some nonlimiting examples with reference to the attached figures. These figures respectively depict.

DETAILED DESCRIPTION

Figure 1:
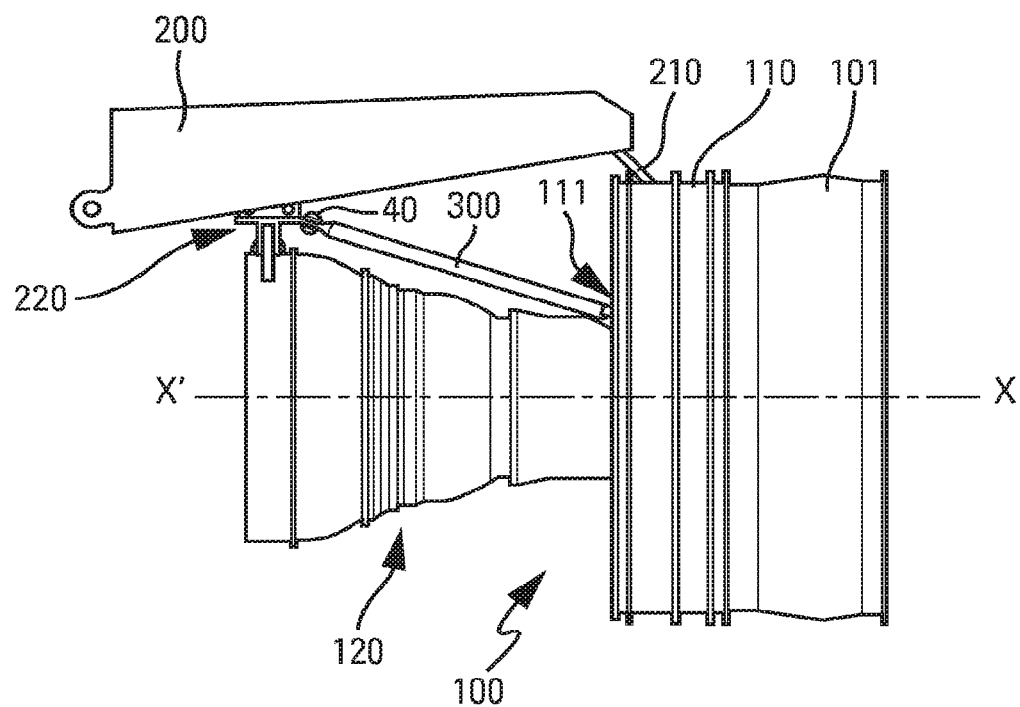
FIG. 1: a lateral view of a turbojet engine suspension.

As illustrated by the lateral view of FIG. 1, a turbojet engine 100 (herein after referred to as "engine") of the type having a fan is made up of an air intake 101 coupled to a large-diameter upstream casing 110 housing the fan, this casing being followed by a downstream power-generator casing 120, hereinafter referred to as "engine casing", which combines several casings—of substantially smaller diameters—housing the compression, combustion, expansion stages in the turbines and the ejection stages in the nozzles, and generally exhibiting symmetry of revolution about an axis X'X.

Suspending the engine 100 under a wing allows the load of the engine to be transferred to the wing structure of the aircraft via a suitable intermediate support structure. Conventionally, this support is a rigid pylon 200 of elongate shape, to which the engine 100 is attached using intermediate attachments extending in a plane substantially perpendicular to the structural casings and to the pylon: an attachment 210 on the upstream casing 110 and a rear attachment 220, connected with the engine casing 120, in the region of the exhaust casing. In addition, thrust rods 300 generally connect the hub 111 of the front casing 110 to the rear attachment 220 via a spreader 40.

Such suspensions are able to manage various types of loading passing through them: vertical loads (the weight of the engine), axial loads (thrust), lateral loads (the buffeting of the wings) and torsional loads (caused by the rotation of the engine or by the loss of a turbine blade). These suspensions need also to be able to adapt to suit the thermal expansions and contractions of the engine. These thermal variations induce a not insignificant change in the direction of the loadings acting on the suspensions.

Figure 2:
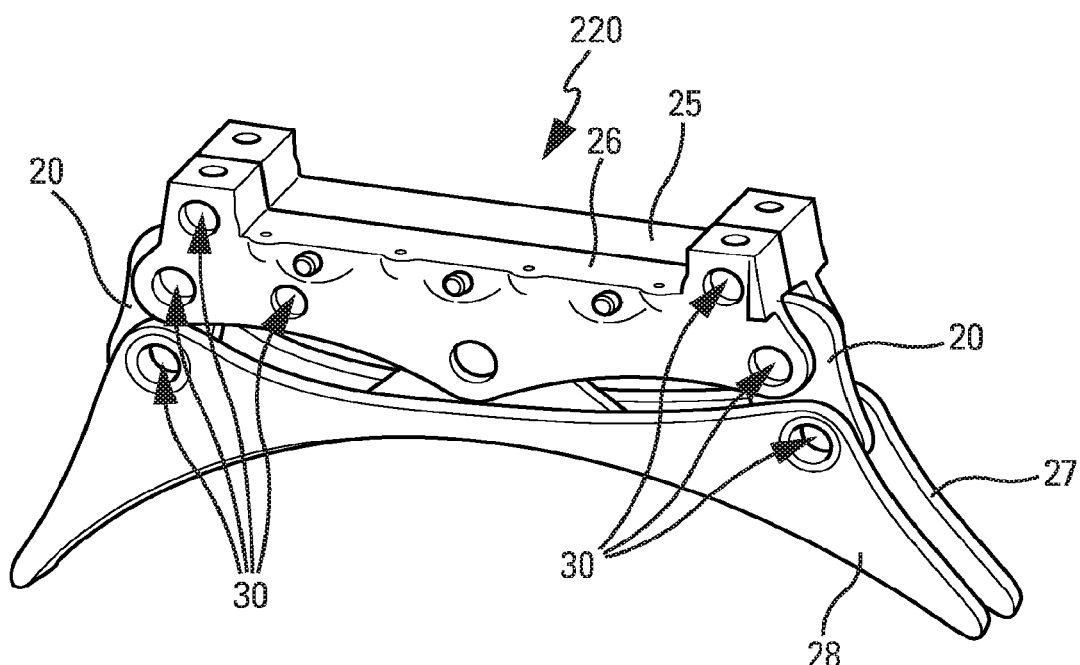
FIG. 2: a perspective view of an engine rear attachment to be equipped with instrumented shafts according to the invention.

As illustrated more specifically in FIG. 2, the rear attachment 220 comprises yokes for connection to the engine 100 and to the pylon 200. Connecting rods 20 form intermediate articulations between the yokes. These connecting rods operate in tension in vertical planes perpendicular to the axis of rotation XX of the engine. The upper part of the attachment 220 is formed of two parallel yokes for connection to the pylon, 25 and 26, and its lower part is formed of two parallel base yokes, 27 and 28, of a curvature suited to the engine casing.

The yokes 25 and 26 on the one hand, and 27 and 28 on the other, are respectively joined together, directly or via the intermediate connecting rods 20, through the collinear circular openings 30. The joins are made by hollow pins also known as "hollow shafts" passing through these openings. These shafts are instrumented according to the method of the invention so as to measure all the loadings passing through these joining regions, and only these joining regions, from the engine toward the wing structure.

Figure 3:
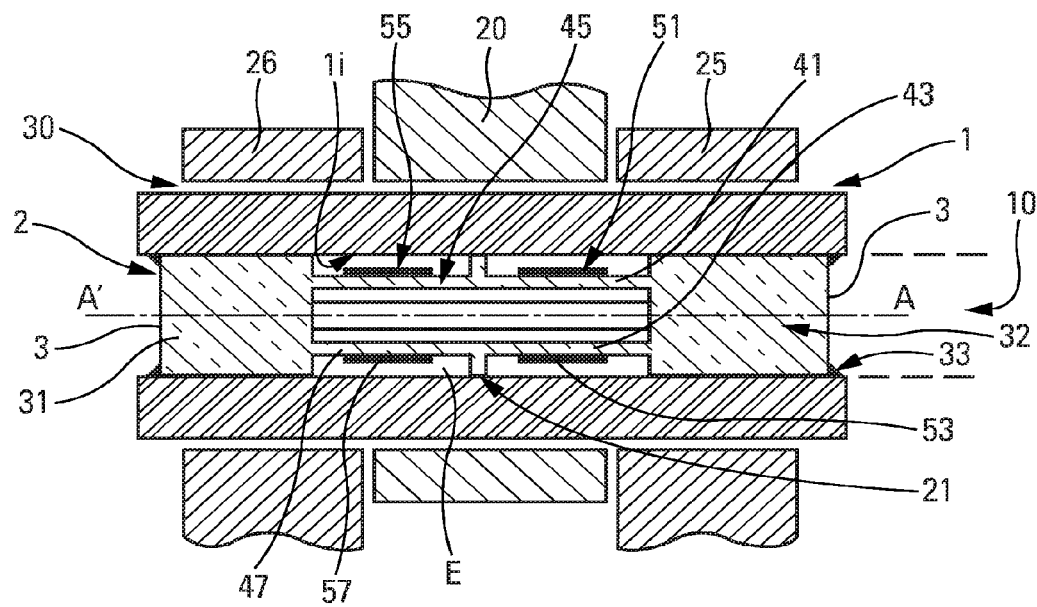
FIG. 3: a schematic view in cross section of a hollow shaft equipped with an instrumented insert and introduced into a connection between yokes of an engine rear attachment.

The view in cross section in FIG. 3 illustrates one example of an instrumented hollow shaft 1 of axis of symmetry A'A for taking measurements of loadings in an engine rear attachment join region. The hollow shaft 1 is introduced into the aligned cylindrical openings 30 of the connecting rod 20 and of yokes 25 and 26 in order to join these three components together (cf. also FIG. 2).

The hollow shaft 1 is instrumented by mounting an insert 2 in the longitudinal internal housing 10 thereof. The insert and the hollow shaft are made of a steel-based alloy in this example. The insert is made up of a central bearer 21 in close contact with the cylindrical internal wall $1i$ of the shaft 1 and coupled, on each side, to a bobweight 31 and 32, likewise in close contact with the wall $1i$. The end faces 3 of the bobweights are laser welded (welds 33) to the internal wall $1i$. The central bearer 21 is connected to the bobweights 31 and 32 by tabs 41, 43, 45, 47, only four of these tabs being visible in the figure.

The tabs are mounted out of contact with the internal wall $1i$ of the shaft so that spaces "E" are created between the tabs and this wall. High-temperature extensometric strain gauges: 51, 53, 55 and 57 visible in the figure—capable for example of withstanding temperatures of 450° or above—are welded to the tabs 41 to 47 respectively. The electrical equipment is depicted in the next figure. Thanks to the empty spaces E created by the presence of non-contacting tabs, the insert, and therefore the shaft, have been able to be instrumented without problem.

The close contacts established between the central bearer 21, the bobweights 31 and 32 on the one hand, and the internal wall $1i$ of the hollow shaft 1 on the other, induce bending of the insert 2 when the shaft 1 bends under the loadings passing through the yokes and the connecting rod. During this bending, tabs on the same side of the axis A'A—41 and 45 or 43 and 47—experience the same elongation or, respectively, the same contraction. The measuring of the elongations and contractions of the tabs by the strain gauges yields the values for the bending experienced by the shaft 1. It is then an easy matter to determine the intensity and direction of the shear force, through prior calibration.

Figure 4:
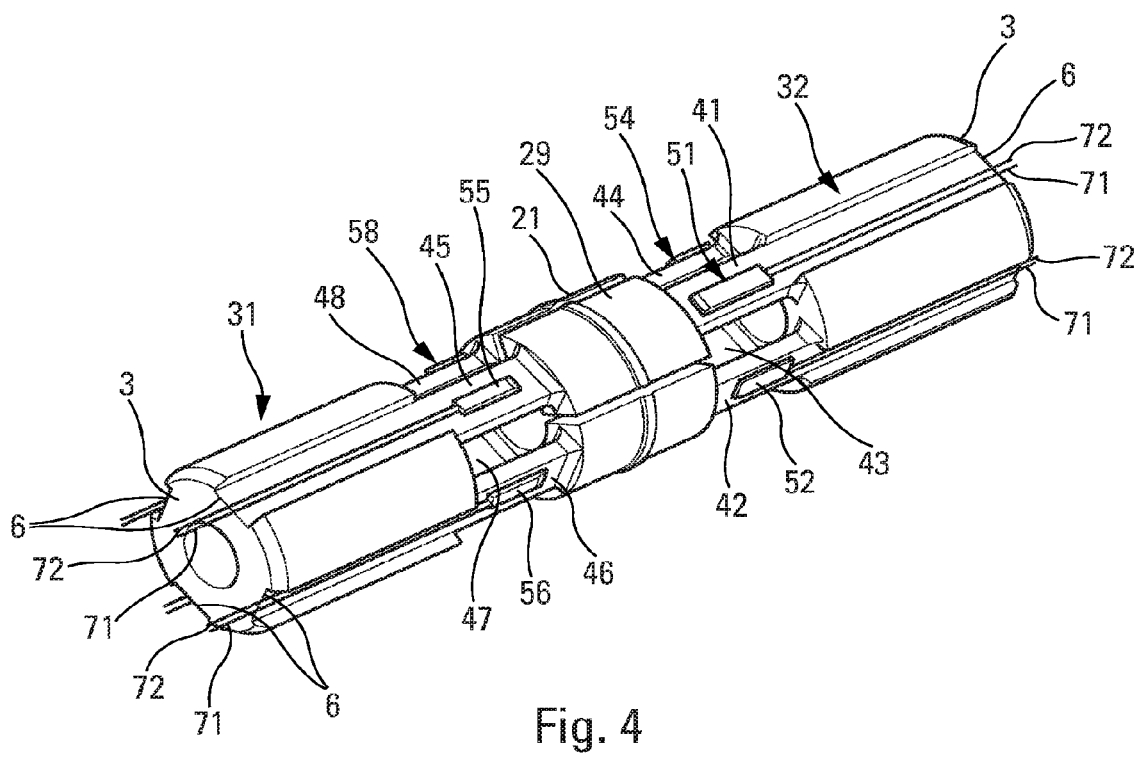
FIG. 4: a perspective view of one example of an instrumented insert that can be introduced into the hollow shaft of FIG. 3.

For preference, the insert has eight tabs and eight gauges, as illustrated in the perspective view of FIG. 4, which will now be used as the reference for the description which follows. The central bearer 21 is formed on a cylindrical support 29, itself central, to which two groups of four tabs 41 to 44 and 45 to 48 are welded. The tabs extend as far as the end faces 3 of the bobweights 31 and 32 in grooves 6 formed in these bobweights. Advantageously, the tabs and the bobweights are machined as a single piece and the tabs are welded to the central support. The bobweight/tabs/support assembly may also be machined as a single piece.

Electric wires 71 power the high-temperature gauges 51 to 58, welded to the tabs 41 to 48. Return electric wires returning current 72 from the gauges are connected to the terminals of two external electrical balancing bridges (not depicted). Strain gauges 51 to 54 and 55 to 58 are welded to the tabs. The four gauges of each of the groups of tabs, which is situated on each side of the central bearer 21 (which means to say between the central bearer 21 and one and the same bobweight 31 or 32), are mounted at the four terminals of a bridge of the Wheatstone bridge type. Each bridge measures the variations in electrical resistance of the gauges, this corresponding to the flexural deformation of the tabs. Measuring the values obtained makes it possible to determine the flexural deformation of the shaft in its central shear plane.

The invention is not restricted to the embodiments described and illustrated. For example, it is possible to provide bobweights and a central bearer of a shape suited to the loading regions: spherical, parallelepipedal, of polygonal section, etc. Furthermore, the number and shape of the tabs may also be altered to suit the region. The invention applies to any mechanical connection or assembly between structures between which strain or loading forces are applied: pylons, cranes, chassis, etc.

The invention claimed is:

1. A method for measuring passage of loadings through rear suspension attachments of an aircraft turbojet engine providing connection between a pylon and an engine casing, a rear attachment being made up of connecting yokes joined together via a plurality of connecting rods, the connecting yokes and the plurality of connecting rods constituting mounts having collinear openings in which hollow connecting shafts are instrumented, said method comprising:
    creating a component having at least first and second parts and a central bearer, all configured to come into contact with an inner wall of the corresponding hollow shaft, and having a first plurality of intermediate portions extending longitudinally from the central bearer to the first part without contact with the region between the parts and the central bearer and a second plurality of intermediate portions extending longitudinally from the central bearer to the second part without contact with the region between the parts and the central bearer, wherein each of adjacent intermediate portions of the first and second pluralities is spaced apart from one another by a circumferential gap and is disposed at a predetermined radial distance away from an axis of symmetry of the corresponding hollow shaft;
    instrumenting the first and second pluralities of intermediate portions for extensometric measurement,
    inserting the instrumented component into a region through which loadings pass to establish a plurality of contacts with the first and second parts and the central bearer, so that bending of the region induces bending of the intermediate portions of the component, and
    measuring flexural deformation of the region in shear planes from variations in length of the intermediate portions using the instrumentation of the component.

2. The method for measuring the passage of loadings as claimed in claim 1, in which the measurement of bending is carried out by electrical connection to the intermediate portions.

3. An instrumented hollow shaft for implementing the method for measuring loadings as claimed in claim 1, comprising:
    a region through which loadings pass in a rear suspension attachment and takes a form configured to be inserted into collinear openings of the mounts of the rear suspension attachment,
    a hollow shaft;
    an insert inserted into the hollow shaft and comprising at least one central bearer in close contact with the internal wall of the hollow shaft and connected to a first bobweight on a first side and to a second bobweight on a second side, in close contact, via a first plurality of tabs running longitudinally from the at least one central bearer to the first bobweight without contact with said internal wall and a second plurality of tabs running longitudinally from the at least one central bearer to the second bobweight without contact with said internal wall, wherein each of adjacent tabs of the first and second pluralities is spaced apart from one another by a circumferential gap and is disposed at a predetermined radial distance away from an axis of symmetry of the hollow shaft; and
    a plurality of high-temperature gauges welded to the first and second pluralities of tabs, electrically powered and connected to the terminals of at least one electric balancing bridge configured to measure a variation in electrical resistance corresponding to the flexural deformation of the tabs.

4. The instrumented hollow shaft as claimed in claim 3, wherein the tabs extend into grooves made in the first and second bobweights.

5. The instrumented hollow shaft as claimed in claim 3, wherein the tabs and the first and second bobweights are machined as a single component.

6. The instrumented hollow shaft as claimed in claim 3, wherein the tabs connecting a central support for the central bearer to the first and second bobweights form first and second groups of four tabs, respectively, the strain gauges of each of the first and second groups are connected to an electrical balancing bridge.

* * * * *